S. P. BRIGGS.
Hand-Seeder.
No. {1,174, 32,178.}
Patented Apr. 30, 1861.
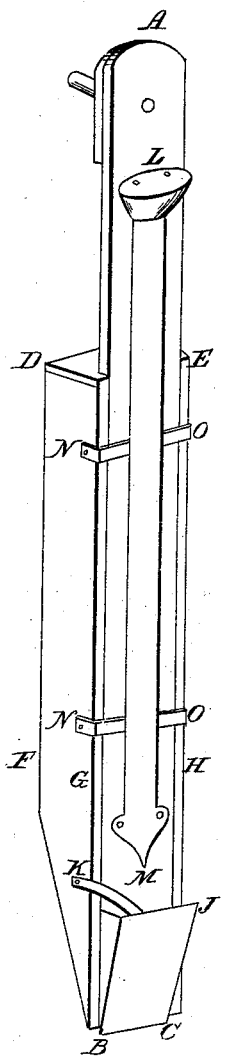
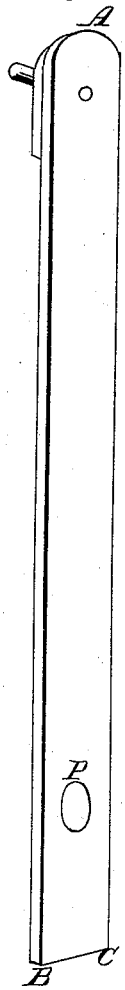
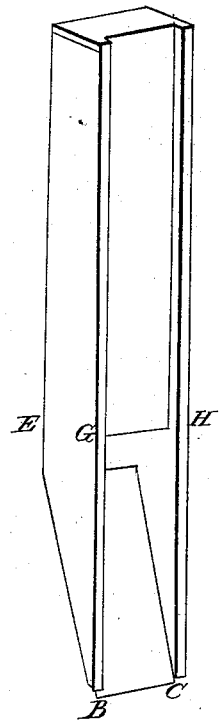
Witnesses:
Inventor
Silas P. Briggs

UNITED STATES PATENT OFFICE.

SILAS P. BRIGGS, OF SARATOGA SPRINGS, NEW YORK.

IMPROVEMENT IN HAND CORN-PLANTERS.

Specification forming part of Letters Patent No. 32,178, dated April 30, 1861.

*To all whom it may concern:*

Be it known that I, SILAS P. BRIGGS, of Saratoga Springs, county of Saratoga, and State of New York, have invented a new and Improved Attachment to Hand Corn or Seed Planters; and I do hereby declare that the following is a full and exact description thereof, reference being had to the accompanying drawings, and to the letters of reference marked thereon.

The nature of my invention consists in attaching to any ordinary hand corn or seed planter which is operated by one hand a tube in the manner hereinafter described.

To enable others skilled in the art to make and use my invention, I will proceed to describe its construction and operation.

A B C, Figure I, exhibit an ordinary hand corn-planter. The main seeds to be planted are put in the box D E F G H, which has an internal apparatus at F G H, which separates the proper number of kernels for each hill, and those kernels at each stroke of the machine fall through the open space in the lower part of the box, as seen at G H B C, Fig. III, into the jaws or shell B C I J, Fig. I, so that when the plunger or follower A B C (more fully exhibited in Fig. II) is forced down by the operator it carries the seeds into the ground. The outer part of the shell B C I J is hinged and operated by the spring K, so that as soon as the plunger rises after forcing the seeds into the ground the shell closes, so as to retain the charge for the next hill. The tube (made of tin or other suitable material) is attached to the plunger at L and M, and stands out a little from it near the iron straps N O and N O, so as to permit free play of the plunger the necessary distance—some three or four inches up and down. The tube at the lower end is cut away on the inside and flattened down on the outside, so that whatever is put in it will fall through a corresponding hole in the plunger, as seen at P, Fig. II, and pass directly down into the shell near B C, Fig. I, and be driven into the ground with the kernels of corn. This tube might end so as to discharge into the outer part of the shell I J B C and have the same effect.

The object of my improvement is to enable the operator, as he in using raises the machine between the hills, to insert with the other hand one or more pumpkin or other seeds, or any fertilizer, or both, at will, so that such deposit will be discharged with the seeds from the box into the next hill. The passage through the tube and lower part of the machine is so direct and free that even powdered fertilizers are readily deposited in the hill simultaneously with the seeds.

What I claim as my invention, and desire to secure by Letters Patent, is—

The attachment to hand corn or seed planters of a tube in connection with the plunger, substantially in the manner and for the purposes set forth in my specification.

SILAS P. BRIGGS.

Witnesses:
 JOHN S. HOLLINGSHEAD,
 R. O'BRIEN.